United States Patent
MacGougan et al.

(10) Patent No.: US 8,892,390 B2
(45) Date of Patent: Nov. 18, 2014

(54) DETERMINING MOTION STATES

(75) Inventors: Glenn Donald MacGougan, San Jose, CA (US); Robert Mayor, Half Moon Bay, CA (US); Ronald K. Huang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 710 days.

(21) Appl. No.: 13/153,353

(22) Filed: Jun. 3, 2011

(65) Prior Publication Data

US 2012/0309412 A1 Dec. 6, 2012

(51) Int. Cl.
 G01P 15/00 (2006.01)
 G06F 3/0346 (2013.01)
 G06F 1/16 (2006.01)
 G06F 3/038 (2013.01)
 G01P 15/08 (2006.01)
 H04W 64/00 (2009.01)

(52) U.S. Cl.
 CPC ............ G06F 1/1694 (2013.01); G06F 3/0346 (2013.01); *G01P 15/08* (2013.01); *H04W 64/006* (2013.01); *G01P 15/00* (2013.01); *G06F 3/038* (2013.01)
 USPC ........... 702/141; 702/150; 702/151; 702/152; 702/153

(58) Field of Classification Search
 CPC .. A61B 5/1116; A61B 5/1117; A61B 5/1123; G01P 15/00–15/005; G06F 3/03; G06F 3/0346; G06F 1/1694
 USPC .......................................................... 702/141
 See application file for complete search history.

(56) References Cited

U.S. PATENT DOCUMENTS

| | | | |
|---|---|---|---|
| 5,828,987 A | 10/1998 | Tano et al. | |
| 6,983,219 B2 | 1/2006 | Mantyjarvi et al. | |
| 6,997,882 B1* | 2/2006 | Parker et al. | 600/534 |
| 2002/0170193 A1* | 11/2002 | Townsend et al. | 33/512 |
| 2003/0163287 A1* | 8/2003 | Vock et al. | 702/187 |
| 2008/0174550 A1 | 7/2008 | Laurila et al. | |
| 2012/0265716 A1* | 10/2012 | Hunzinger et al. | 706/12 |

OTHER PUBLICATIONS

Tuck, Kimberly, "Tilt Sensing Using Linear Accelerometers," Freescale Semiconductor; AN3461; Rev 2, Jun. 2007; [online], http://www.freescale.com/files/sensors/doc/app_note/AN3461.pdf.

* cited by examiner

*Primary Examiner* — Mischita Henson
(74) *Attorney, Agent, or Firm* — Fish & Richardson P.C.

(57) ABSTRACT

Methods, systems, and apparatus, including computer programs encoded on a computer storage medium, for determining a motion state of a mobile device. Accelerometer data is received from accelerometer sensors onboard the mobile device, wherein the accelerometer data represents acceleration of the mobile device in three-dimensional space. An accelerometer signal vector representing at least a force due to gravity on the mobile device is determined. Two-dimensional accelerometer data orthogonal to the accelerometer signal vector is calculated. A motion state of the mobile device is determined based on the two-dimensional accelerometer data.

20 Claims, 6 Drawing Sheets

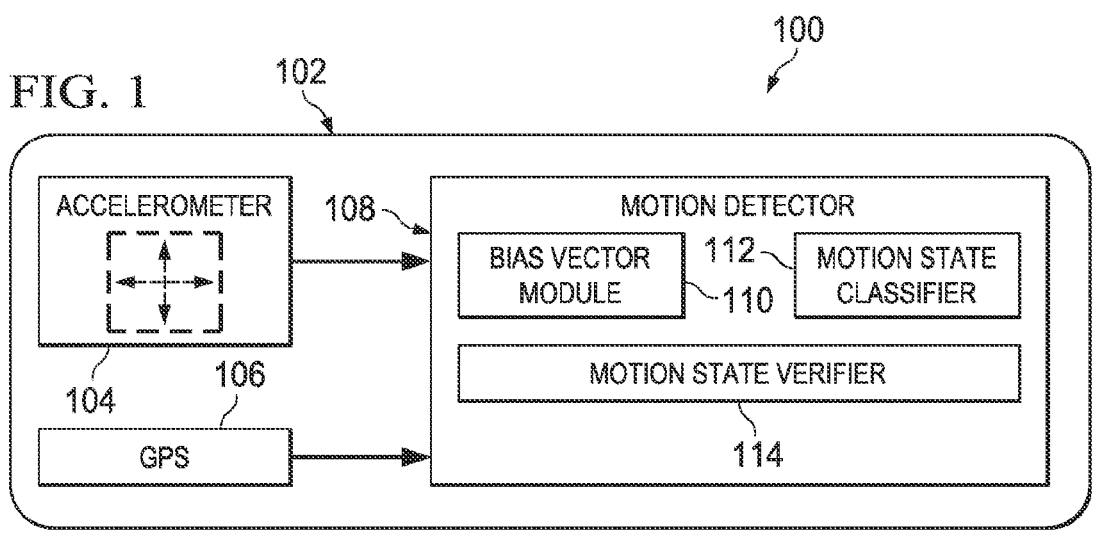
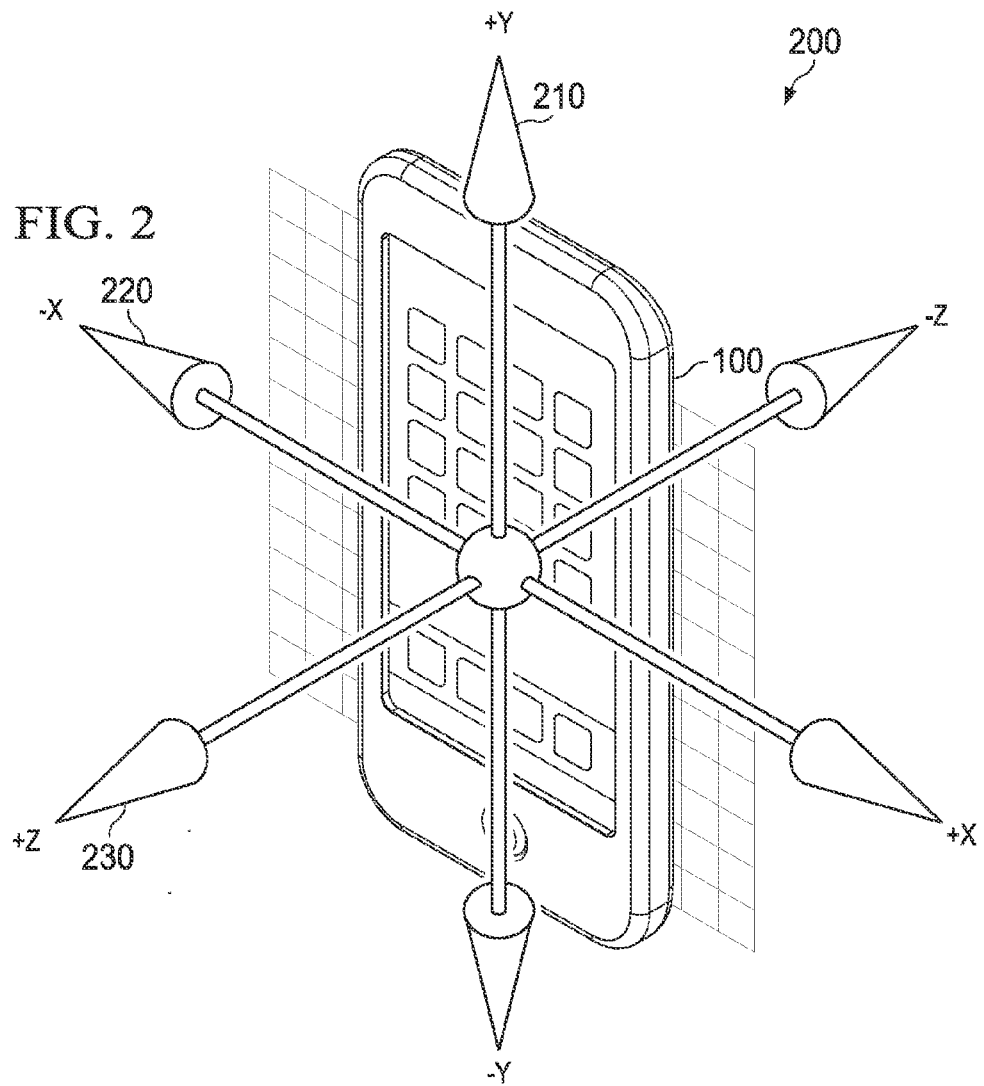

DETERMINING MOTION STATES

TECHNICAL FIELD

The subject matter described in this specification relates to determining a motion state of a mobile device.

BACKGROUND

Some modern mobile devices contain a variety of sensors that provide useful dynamic information about the current state of the device. For example, some devices include a three axis accelerometer that measures linear acceleration within a local inertial frame and a three axis magnetometer. One purpose of the accelerometer and magnetometer is to provide device orientation measurements (e.g., pitch, roll and yaw angles). Some devices include a global navigation satellite system (GNSS) (e.g., Global Position System (GPS)) receiver that provides three dimensional location measurements in real-time for use by applications (e.g., map services). In some mobile devices, other sensors are also included, such as a proximity sensor to detect the mobile device's proximity to a user's ear, and image or audio sensors for capturing images, voice, and/or video. The data collected from the sensors on a mobile device and other contextual data associated with the mobile device can be used for various applications.

SUMMARY

In accordance with the systems and processes described in this specification, accelerometer data is received from accelerometer sensors onboard the mobile device, wherein the accelerometer data represents acceleration of the mobile device in three-dimensional space. An accelerometer signal vector representing at least a force due to gravity on the mobile device is determined. Two-dimensional accelerometer data orthogonal to the accelerometer signal vector is calculated. A motion state of the mobile device based on the two-dimensional accelerometer data is determined.

Possible implementations can optionally include one or more of the following features. The accelerometer data is comprised of a time series vector of tri-axial accelerometer samples. Determining an accelerometer signal vector includes dividing the time series vector of tri-axial accelerometer samples into a first and second part, each of the first and second parts including at least a threshold number of discrete sensor samples; determining the accelerometer signal vector based on vector components of a gravity signal contained in the accelerometer samples of the first part; and identifying an orthogonal plane corresponding to the accelerometer signal vector, the orthogonal plane orthogonal to the accelerometer signal vector. The accelerometer signal vector includes vector components of accelerometer sensor bias present on each axis of the tri-axial accelerometer samples.

Calculating two-dimensional accelerometer data includes computing a roll angle and a pitch angle required to rotate the accelerometer signal vector to substantially align with a vertical axis of the accelerometer samples; and rotating vectors representing each of the accelerometer samples in the second part by the computed roll and pitch angles such that the accelerometer signal vector is substantially aligned with the vertical axis and the orthogonal plane is orthogonal to the vertical axis. Determining the motion state of the mobile device includes identifying values of vector components of the rotated accelerometer samples in the orthogonal plane; integrating the values of the vector components over a duration of the second part; determining that the mobile device has at least a horizontal movement motion state if the integrated values exceed a horizontal motion threshold value; identifying a variance in the vertical axis of the accelerometer samples; and determining that the mobile device has at least a vertical movement motion state if the variance in the vertical axis exceeds a vertical motion threshold value. A speed of the mobile device calculated based on Global Positioning System (or other global navigation satellite system) signals is used to verify the determined motion state of the mobile device. A confidence level associated with the determined motion state of the mobile device based on one or more previous determinations of motion state of the mobile device is assigned.

Particular embodiments of the subject matter described in this specification can be implemented so as to realize one or more of the following advantages. Sensor data can be collected to determine a motion state of a mobile device. Highly sensitive motion detection is achieved by analyzing accelerometer signals in a plane orthogonal to a mean signal vector obtained in a static state of a mobile device. Signals associated with gravity or sensor bias may be excluded from the motion detection process.

The details of one or more embodiments of the invention are set forth in the accompanying drawings and the description below. Other features of the invention will be apparent from the description and drawings, and from the claims.

BRIEF DESCRIPTION OF THE DRAWINGS

FIG. 1 is a block diagram of an example mobile device.

FIG. 2 is a block diagram of the axes used to represent data collected by sensors on the mobile device of FIG. 1.

Like reference numbers and designations in the various drawings indicate like elements.

DETAILED DESCRIPTION

Figure 3:
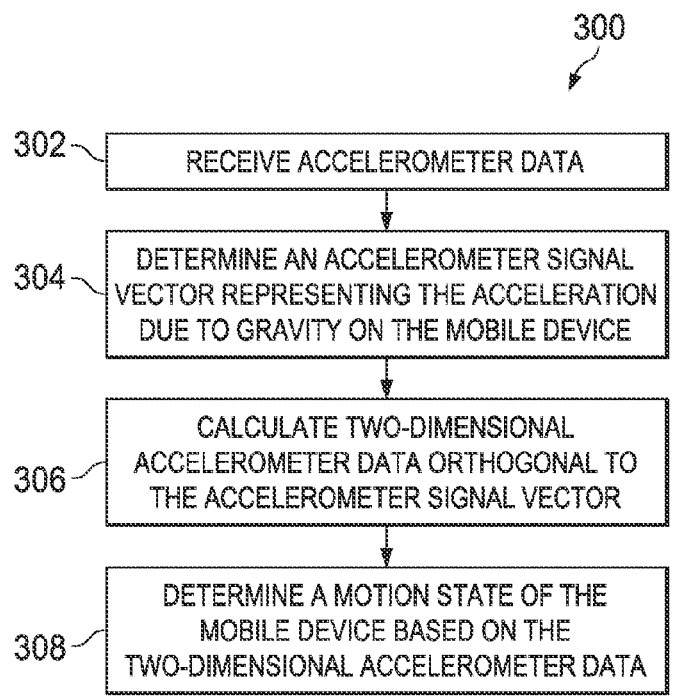
FIG. 3 is a flow diagram of an example process for determining a motion state of a mobile device.

This specification generally describes identifying the acceleration due to gravity on a mobile device and minimizing the effect of the gravity force while performing calculations for determining a motion state of the mobile device. Typically, a tri-axial accelerometer sensor detects acceleration of a mobile device in three dimensions, represented as a vector with components in three axes. When the mobile device is not moving, or static, the mobile device is affected only by gravity. During the static state, a signal vector can be defined that represents the acceleration due to gravity affecting the accelerometer data. As additional data samples are received from the accelerometer, gravity effects on the mobile device (that are represented by the signal vector) that are present in the additional data samples are filtered while values related to actual movement of the mobile device are extracted to determine a motion state of the mobile device. Accordingly, a high level of sensitivity with regard to whether the mobile device is moving or static may be achieved.

In particular, the data associated with vector components that are not aligned with the signal vector representing gravity are used to determine a motion state of the mobile device. In some implementations, the signal vector is identified and rotated such that the signal vector is aligned (or at least substantially aligned) with a vertical axis of the accelerometer data. The vectors associated with accelerometer data are similarly rotated based on the same angles of rotation as the signal vector. The data represented by axes that are orthogonal to the vertical axis are used to determine the motion state of the mobile device.

Mobile Device Overview

FIG. 1 is a block diagram 100 of an example mobile device 102. The mobile device 102 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or other electronic device or a combination of any two or more of these data processing devices or other data processing devices. Although the description below refers generally to mobile device 102, any computing device, including a laptop or tablet, may be used in accordance with the features described in the present disclosure. 100201 In some implementations, the mobile device 102 can include an accelerometer sensor 104, which can be utilized to detect movement of the mobile device 102. Accordingly, display objects and/or media can be presented according to a detected orientation, e.g., portrait or landscape. In some implementations, the mobile device 100 may include circuitry and sensors for supporting a location determining capability, such as that provided by the global positioning system (GPS) 106, other global navigation satellite system, or other positioning system (e.g., systems using Wi-Fi access points, television signals, cellular grids, Uniform Resource Locators (URLs)). In some implementations, a positioning system (e.g., a GPS receiver) can be integrated into the mobile device 102 or provided as a separate device that can be coupled to the mobile device 102 through an interface (e.g., port device) to provide access to location-based services.

The accelerometer sensor 104 can be configured to collect samples at a particular sampling frequency. Further, samples collected by the accelerometer sensor 104 may be represented in three dimensions, such as a vector with components in three axes. For example, FIG. 2 is a diagram 200 illustrating an example of a mobile device 102 associated with three device axes in which accelerometer data can be collected. As depicted in FIG. 2, the mobile device 102 is associated with a vertical Y-axis 210 and two horizontal axes, the X-axis 220 and the Z-axis 230. The output of a tri-axial accelerometer sensor can be defined by Equation 1:

$$a = \begin{bmatrix} a_x \\ a_y \\ a_z \end{bmatrix},$$

where "a" is the vector containing its components in three axes, $a_x$, $a_y$, and $a_z$.

The accelerometer data can indicate an acceleration of the mobile device 102 over a period of time. In some instances, the accelerometer data can be used to determine a motion state associated with the mobile device 102, such as whether the mobile device 102 is moving or stationary (i.e., static). Accordingly, the accelerometer data output from the accelerometer 104 can be sent to a motion detector 108 on the mobile device 102. The motion detector 108 can be configured to determine whether the mobile device 102 is in a static or moving state based on accelerometer data received from the accelerometer 104 as well as other contextual data, such as a speed of the mobile device 102 as determined from the GPS 106 or prior motion states associated with the mobile device 102.

In certain instances, the motion state of the mobile device 102 may vary depending on the sensitivity at which accelerometer samples are detected or processed. For example, accelerometer data collected during a particular time window may be affected by gravity pull as well as other sensor biases. When processing the accelerometer data to determine a motion state of the mobile device 102, the effects of gravity pull and other sensor biases may influence the motion state determination such that small movements in the mobile device 102 unrelated to gravity or sensor bias, for example, may not be detected or may not be significant enough to affect the determination of the mobile device's motion state. Further, a mobile device 102 may be "stationary" from the perspective of a user but may be "moving" from the perspective of a highly-sensitive sensor. Accordingly, in some instances, a static state of the mobile device 102 may be distinguished from a "frozen" state of the mobile device 102. A mobile device 102 in a static state may allow for a higher threshold of motion before exiting the static state into a moving state while a mobile device 102 in a frozen state may exit the frozen state in response to motion only satisfying a very low threshold of motion.

In some applications, achieving high motion sensitivity may not be required. In certain instances, however, the motion detector 108 may need to determine the motion state of the mobile device 102 to a high level of sensitivity. In some implementations, the received accelerometer data can be adjusted so that the effects of gravity and sensor biases are "filtered" to achieve a high level of sensitivity for detection of motion. As seen in FIG. 1, motion detector 108 can include one or more modules, such as a bias vector module 110, a motion state classifier 112, and a motion state verifier 114. It will be understood that while the components included in the mobile device 102 illustrated in FIG. 1, such as motion detector 108, bias vector module 110, motion state classifier 112, and motion state verifier 114, are shown as individual modules that implement the various features and functionality through various objects, methods, or other processes, the functionality provided by the depicted modules may instead be provided by a number of sub-modules, third party services, components, libraries, and such, as appropriate. Conversely, the features and functionality of various components can be combined into single components as appropriate.

The bias vector module 110 is operable to determine a mean signal vector when the mobile device 102 is in a static state. If the mobile device 102 is in a static state, the mean signal vector should correspond to the gravity signal as well as any accelerometer sensor bias that may be present on each axis. The bias vector module 110 is further operable to determine a roll and pitch angle needed to rotate the mean signal vector such that the mean signal vector is aligned with the vertical axis, the Y-axis 210. If subsequent data samples are also rotated by the same angles, the gravity signal (and sensor bias) in each of the subsequent data samples should also automatically be aligned with the Y-axis 210 because the same gravity signal should be present in each subsequent data sample.

With the gravity signal and sensor biases aligned along a single axis, the Y-axis 210, the effect of gravity and sensor biases is automatically excluded from calculations involving sampled data as long as only the vector components of sampled data in the other two axes, the X-axis 220 and Z-axis 230, are collected or processed in subsequent operations. In other words, as long as the vertical component of accelerometer data is ignored, the gravity signal and sensor biases are also ignored because, after rotation, the gravity signal and sensor biases are only present in the vertical axis. Accordingly, high sensitivity of motion in the X-axis 220 and Z-axis 230 can be achieved.

The motion state classifier 112 is configured to classify the motion state of the mobile device 102 based on data collected after data samples are rotated by the bias vector module 110 as described above. In particular, the motion state classifier 112 identifies the vector components of the accelerometer data samples in the X-axis 220 and Z-axis 230 and determines an amount of motion associated with the mobile device 102. If the amount of motion exceeds a threshold, the motion state classifier 112 assigns the motion state as moving. In some implementations, the motion state classifier 112 can also check a variance in each axis to detect movement, including vertical movement along the Y-axis 210.

In certain implementations, a motion state verifier 114 is used to verify the motion state determined by the motion state classifier 112. For example, the motion state verifier 114 can use other data associated with the mobile device 102, such as a speed determined by a GPS 106 on the mobile device 102, to verify whether a static determination is accurate. In some instances, movement of the mobile device 102 with a constant velocity with no rotations may produce very little detectable motion data. Accordingly, the GPS speed of the mobile device 102 can confirm or contradict an assigned motion state.

Exemplary Processes for Detecting Motion States Associated with a Mobile Device FIG. 3 is a flow chart of an example process 300 for detecting a motion state associated with a mobile device 102. Accelerometer data is received at 302. For example, a mobile device 102 can include accelerometer sensors that collect data indicating an acceleration of the mobile device 102. The accelerometer data may be output from an accelerometer and received at a motion detector module 108, such as depicted in FIG. 1. The motion detector module 108 attempts to determine an accelerometer signal vector representing the acceleration due to gravity on the mobile device 102 at 304. Gravity may include both gravitation force as well as acceleration due to the rotation of the earth. In certain instances, the accelerometer signal vector that represents gravity is the mean signal vector when the mobile device 102 is static.

Figure 4:
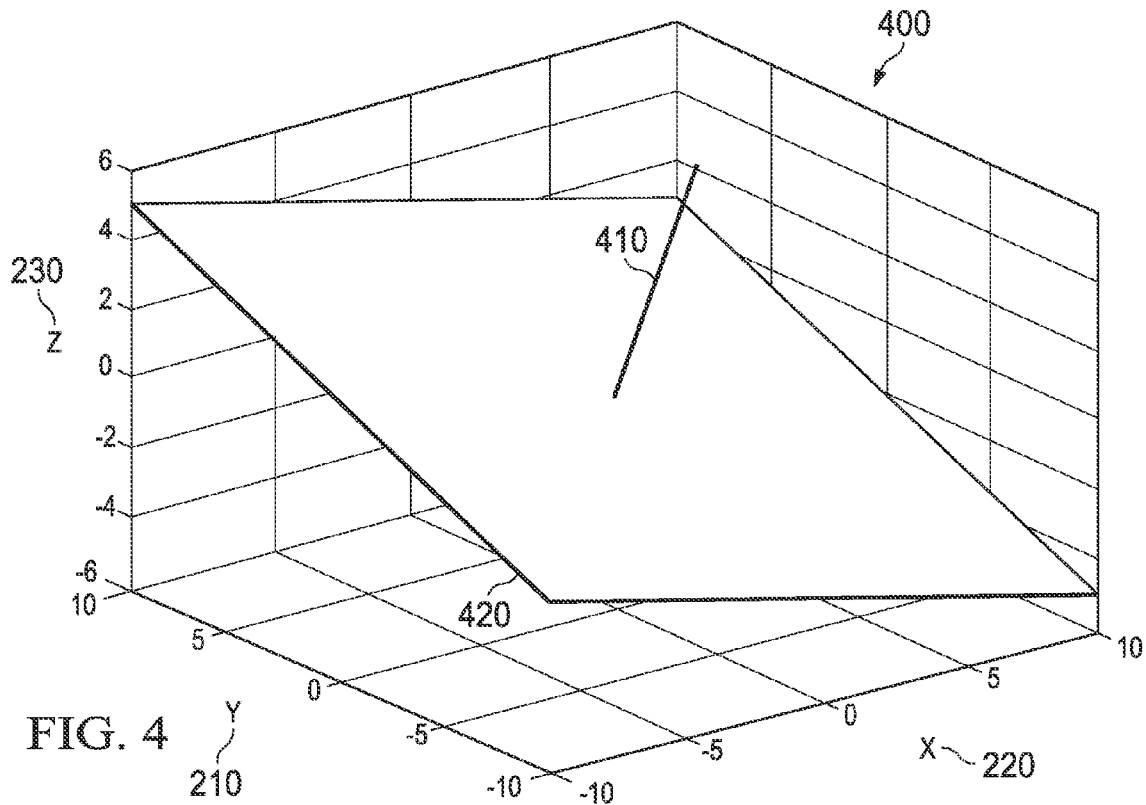
FIG. 4 is a diagram of an example mean signal vector determined during a static state of a mobile device and a corresponding orthogonal plane.

FIG. 4 illustrates a diagram 400 of a mean signal vector 410 and a plane 420 orthogonal to the mean signal vector 410. When the mobile device 102 is not moving (static), the mobile device 102 is affected only by gravity (the sum of gravitational acceleration and centripetal acceleration due to earth rotation). Depending on the orientation of the mobile device 102, the accelerometers on each axis will indicate a vector component of the gravity signal plus whatever accelerometer sensor bias is present on each axis. This is expressed in vector notation by the vector 410, as depicted in Equation 2:

$$a_{static} = \begin{bmatrix} a_{gx} + b_x \\ a_{gy} + b_y \\ a_{gz} + b_z \end{bmatrix}$$

where $a_{gx}$, $a_{gy}$, and $a_{gz}$ are the components of gravity observed by the accelerometers, and $b_x$, $b_y$, and $b_z$ are the sensor axis biases for each near-orthogonal sensor axis. This signal vector 410 defines an orthogonal plane 420 which can be referred to as the "horizontal" plane 420 when static, as depicted in FIG. 4. The gravity signal is constant if the mobile device 102 is not moving and the accelerometer sensor biases are very stable (over many tens of second, for example). If the mobile device 102 is not moving horizontally, the only signals that the accelerometers indicate in the plane orthogonal to the $a_{static}$ vector are due to sensor noise.

In order to obtain the gravity signal, the mean signal vector of mobile device 102 is measured when the mobile device 102 is in a static state. Accordingly, in some implementations, a time series vector of tri-axial accelerometer samples, $a_s$ is divided into two parts of sufficient duration, $a_{s1}$ and $a_{s2}$, with a sufficient number of discrete sensor samples in each part. The first part is used to determine the mean signal vector 410 and the corresponding orthogonal plane 420, and the second part is used to assess the amount of motion in the orthogonal plane 420.

If the mobile device 102 is determined to be static during the first window of samples, $a_{s1}$, the mean signal vector during $a_{s1}$ is identified as the accelerometer signal vector representing the gravity signal, or $a_{static}$. In some implementations, if any of the variances of the accelerometer samples in $a_{s1}$ in each axis is greater than a threshold, motion is apparent, and that time series of samples should not be used to determine the mean signal vector. If the variances are less than the threshold, then the mean signal vector is determined. The plane orthogonal to the mean signal vector is also identified.

Returning to FIG. 3, after $a_{static}$, the accelerometer signal vector representing the gravity signal, is determined, two-dimensional accelerometer data orthogonal to the accelerometer signal vector is calculated at 306. In some implementations, the two-dimensional accelerometer data is included in the accelerometer data in the second part of the data samples, $a_{s2}$. In certain instances, the signal vectors of the data samples in $a_{s2}$ are rotated such that the gravity signal in each of the samples is aligned with the Y-axis 210. The gravity signal for each of the samples in $a_{s2}$ should be the same as $a_{static}$, the mean signal vector (representing the gravity signal in a static state) determined for data samples in $a_{s1}$, because the gravity signal should remain consistent across data samples.

In certain implementations, the roll and pitch angle required to rotate the signal vectors in $a_{s2}$ such that $a_{static}$ is aligned with the Y-axis 210 is calculated, and the samples in $a_{s2}$ are rotated by the calculated roll and pitch angles. To obtain roll and pitch angles, a vector is rotated about the Y-axis (the roll angle, $\phi$, rotation) until the signal in the Z-X plane, denoted by $\beta$, is aligned in the Z-axis component. The roll angle, $\phi$, is derived in Equations 3 to 7.

$$\begin{bmatrix} a'_x \\ a'_y \\ a'_z \end{bmatrix} = R_2(\phi)a = \begin{bmatrix} \cos(\phi) & 0 & -\sin(\phi) \\ 0 & 1 & 0 \\ \sin(\phi) & 0 & \cos(\phi) \end{bmatrix} \begin{bmatrix} a_x \\ a_y \\ a_z \end{bmatrix} = \begin{bmatrix} 0 \\ a'_y \\ \beta \end{bmatrix} \quad (3)$$

$$R_2^{-1}(\phi) = R_2^T(\phi) \quad (4)$$

-continued $$\begin{bmatrix} a_x \\ a_y \\ a_z \end{bmatrix} = R_2^T(\phi) \begin{bmatrix} 0 \\ a'_y \\ \beta \end{bmatrix} = \begin{bmatrix} \cos(\phi) & 0 & \sin(\phi) \\ 0 & 1 & 0 \\ -\sin(\phi) & 0 & \cos(\phi) \end{bmatrix} \begin{bmatrix} 0 \\ a'_y \\ \beta \end{bmatrix} \quad (5)$$

$$a_x = \beta \sin(\phi) \quad (6)$$
$$a_y = a'_y$$
$$a_z = \beta \cos(\phi)$$

$$\phi = \tan^{-1}(a_x/a_z) \quad (7)$$

The accelerometer signal vector, a, rotated into the intermediate frame, a', is defined by Equation 8.

$$\begin{bmatrix} a'_x \\ a'_y \\ a'_z \end{bmatrix} = \begin{bmatrix} \cos(\phi) & 0 & -\sin(\phi) \\ 0 & 1 & 0 \\ \sin(\phi) & 0 & \cos(\phi) \end{bmatrix} \begin{bmatrix} a_x \\ a_y \\ a_z \end{bmatrix} = \quad (8)$$

$$\begin{bmatrix} a_x\cos(\phi) - a_z\sin(\phi) \\ a_y \\ a_x\sin(\phi) + a_z\cos(\phi) \end{bmatrix} = \begin{bmatrix} 0 \\ a_y \\ a_x\sin(\phi) + a_z\cos(\phi) \end{bmatrix}$$

The vector is then rotated about the X-axis (the pitch angle, ψ) until all the signal is in the Y-axis component. The pitch angle defined here is the angle required to rotate the signal, after rotating by the roll angle φ, into the frame aligned as shown in FIG. 2. The pitch angle, ψ, is derived in Equations 9 to 13.

$$\begin{bmatrix} a_x^n \\ a_y^n \\ a_z^n \end{bmatrix} = R_1(\psi)a' = \begin{bmatrix} 0 \\ \Psi \\ 0 \end{bmatrix} = \begin{bmatrix} 1 & 0 & 0 \\ 0 & \cos(\psi) & \sin(\psi) \\ 0 & -\sin(\psi) & \cos(\psi) \end{bmatrix} \begin{bmatrix} a'_x \\ a'_y \\ a'_z \end{bmatrix} \quad (9)$$

$$R_1^{-1}(\psi) = R_1^T(\psi) \quad (10)$$

$$\begin{bmatrix} a'_x \\ a'_y \\ a'_z \end{bmatrix} = R_1^T(\psi) \begin{bmatrix} 0 \\ \Psi \\ 0 \end{bmatrix} = \begin{bmatrix} 1 & 0 & 0 \\ 0 & \cos(\psi) & -\sin(\psi) \\ 0 & \sin(\psi) & \cos(\psi) \end{bmatrix} \begin{bmatrix} 0 \\ \Psi \\ 0 \end{bmatrix} \quad (11)$$

$$a'_x = 0 \quad (12)$$
$$a'_y = \Psi\cos(\psi)$$
$$a'_z = \Psi\sin(\psi)$$

$$\psi = \tan^{-1}(a'_z/a'_y) \quad (13)$$

After the data samples are rotated, the vector components of the data samples in the X-axis and Z-axis (i.e., the axes in the plane orthogonal to the rotated $a_{static}$ vector) are identified. Since the gravity signal represented by $a_{static}$ is now represented only in the Y-axis, two-dimensional data collected in the plane orthogonal to $a_{static}$ automatically excludes the gravity signal.

A motion state of the mobile device 102 can now be determined at 308 based on the two-dimensional accelerometer data calculated from the orthogonal plane. If the amount of motion in $a_{s2}$ exceeds a threshold, the mobile device 102 is in a moving state. In some implementations, the amount of motion is determined by the integration of the value of the accelerometer signals in the orthogonal plane over the window $a_{s2}$. The amount of motion is then compared to a threshold to determine the motion state of the mobile device 102. The variance in each axis (after rotation) can also be checked against a threshold value to detect movement, which includes checking for vertical movement.

The determination of the motion state of the mobile device 102 using two-dimensional data orthogonal to a mean signal vector of the mobile device 102 in a static state can yield high-sensitivity detection of motion at least in a horizontal plane with some detection of movement in a vertical plane. In some instances, the high-sensitivity motion detection capability can allow for additional static states. A normal static state may allow for some amount of movement or signal detected by the accelerometer before transitioning to a moving state. The high-sensitivity motion detection capability described in this specification can also allow for a "frozen" state in which a very small signal, which would not normally trigger a transition from a static state to a moving state, may trigger transition of the mobile device 102 from the frozen state to a static state (or to a moving state if the signal is larger).

The dividing of sampled data into two parts, $a_s$, and $a_{s2}$, in order to calculate a mean signal vector in a static state in the first part and to determine an amount of motion in the second part as described above can facilitate the high-sensitivity detection of motion in at least the horizontal plane. The performance of the motion detector 108 may be influenced by the ability to define the plane orthogonal to the mean signal vector in the static state. For example, if the device is static over $a_s$, and $a_{s2}$, then the amount of motion assessed using $a_{s2}$ will be very small. If the device is static over $a_{s1}$ but has moved horizontally without rotating during $a_{s2}$, then the amount of motion assessed using $a_{s2}$ will reflect the horizontal movement. If the device is static over $a_{s1}$ but has rotated about the axes of the orthogonal plane during $a_{s2}$ then the amount of motion assessed using $a_{s2}$ will include some of the gravity signal in the integration and this results in a large apparent horizontal movement.

If the device is moving slightly during $a_{s1}$ but is not rotating and the device is static over $a_{s2}$, then the orthogonal plane (horizontal plane) is still well defined, and the amount of motion assessed during $a_{s2}$ will still be very small. If the device is moving slightly during $a_{s1}$ but is not rotating and the device is moving slightly but not rotating during $a_{s2}$, then the orthogonal plane (horizontal plane) is still well defined, and the amount of motion assessed using $a_{s2}$ will reflect the horizontal movement. If the device has rotated about the axes of the horizontal plane during $a_{s1}$ then the amount of motion assessed using $a_{s2}$ will include some of the gravity signal in the integration and this results in a large apparent horizontal movement. If the device is static over $a_{s1}$ and only moving vertically during $a_{s2}$, then the amount of motion assessed using $a_{s2}$ will be very small. In some implementations, in order to rectify the deficient detection of vertical motion, the variance of the signal in the vertical component can also be tested against a threshold to assess motion.

In some instances, the motion detector 108 may only detect very small amounts of motion when the mobile device 102 is moving with a constant velocity in a non-rotating motion. If the device is moving at a constant velocity but not rotating over $a_{s1}$ and $a_{s2}$, then the orthogonal plane (horizontal plane) is still well defined, and the amount of apparent motion assessed using $a_{s2}$ will still be very small. This may be known as false static detection. The use of GPS speed, if available, aids in rejecting false no-motion events. If a low pass filtered GPS speed value minus the instantaneous 1-sigma speed uncertainty is greater than a threshold, the static detection is rejected.

Further, in some implementations, a confidence level in the identified static or frozen state can be evaluated. The confidence in the static or frozen states increases over time to a limit as additional time windows of samples are used to confirm that the static or frozen state is persistent. The confidence in the state being moving also increases over time to a limit. Thus, both the state of moving/not-moving (static or frozen) and a confidence indication can be provided.

Figure 5:
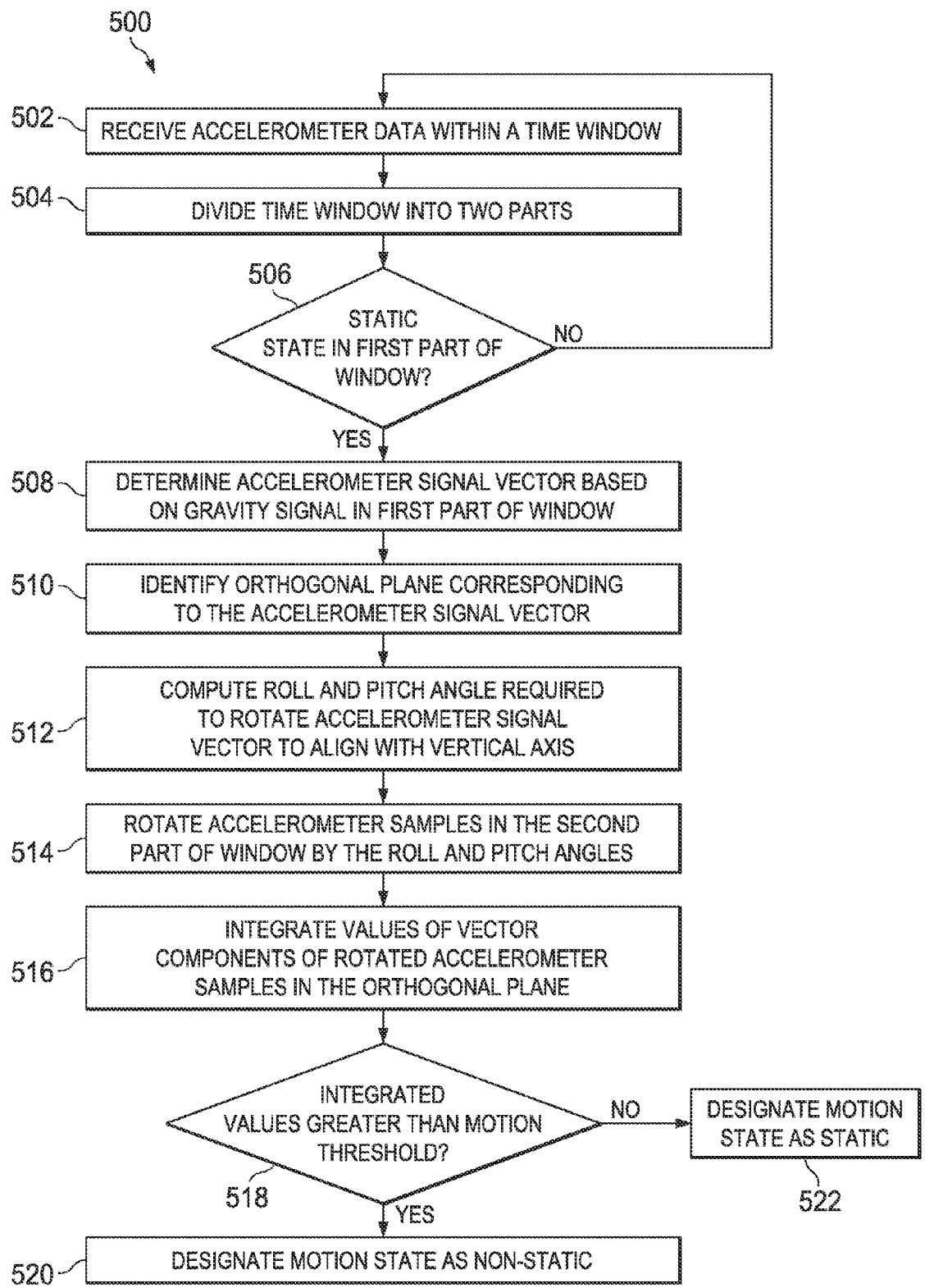
FIG. 5 is a flow diagram of an example process for determining a motion state of a mobile device.

FIG. 5 a flow chart of another example process 500 for detecting a motion state associated with a mobile device 102. Accelerometer data is received within a time window at 502. The time window is divided into two parts at 504. A determination is made at 506 whether the mobile device 102 is in a static state in the first part of the time window. If the mobile device 102 is not associated with a static state in the first part of the time window, the first part of the time window should not be used to determine a mean vector signal, and the process 500 returns to receiving accelerometer data at 502 in order to attempt to find another sample in which the mobile device is in a static state. If the mobile device 102 is associated with a static state in the first part of the time window, an accelerometer signal vector based on the gravity signal in the first part of the window is determined at 508. The mean signal vector during the static state should be the gravity signal.

An orthogonal plane corresponding to the accelerometer signal vector is identified at 510. The roll and pitch angles required to rotate the accelerometer signal vector to align with a vertical axis is computed at 512. The accelerometer samples in the second part of the time window are rotated by the computed roll and pitch angles at 514. The values of the vector components of the rotated accelerometer samples in the orthogonal plane are integrated at 516. A determination is made as to whether the integrated values are greater than a motion threshold at 518. If the integrated values are greater than the motion threshold, the motion state of the mobile device 102 is designated as non-static at 520. If the integrated values are not greater than the motion threshold, the motion state of the mobile device 102 is designated as static at 522.

Example Mobile Device

Figure 6:
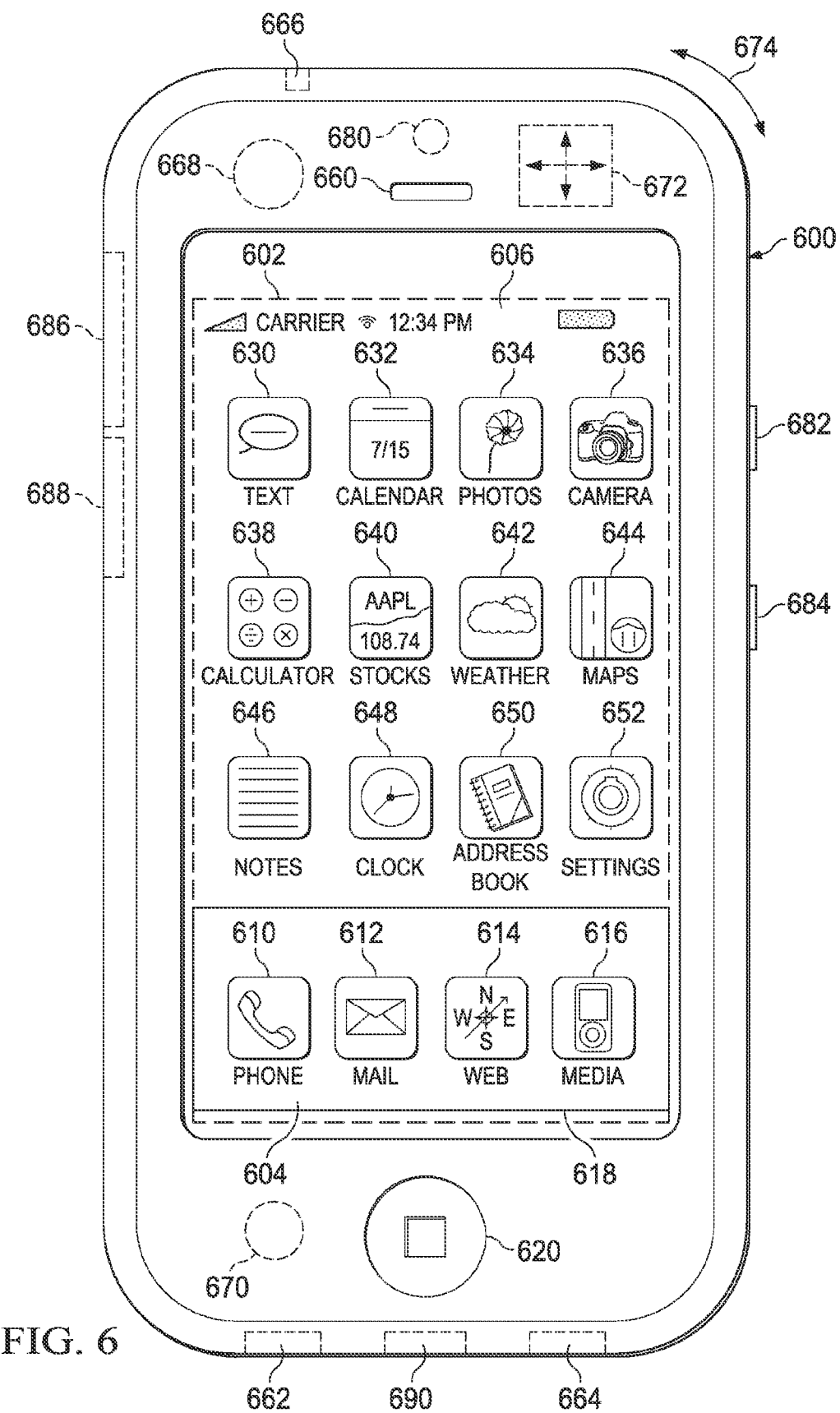
FIG. 6 is a block diagram of an example mobile device.

FIG. 6 is a block diagram of an example mobile device 600. In some implementations, the mobile device 600 includes a touch-sensitive display 602. The touch-sensitive display 602 can implement liquid crystal display (LCD) technology, light emitting polymer display (LPD) technology, or some other display technology. The touch-sensitive display 602 can be sensitive to haptic and/or tactile contact with a user. The touch-sensitive display 602 can comprise a multi-touch-sensitive display 602. A multi-touch-sensitive display 602 can, for example, process multiple simultaneous touch points, including processing data related to the pressure, degree and/or position of each touch point.

In some implementations, the mobile device 600 can display one or more graphical user interfaces on the touch-sensitive display 602 for providing the user access to various system objects and for conveying information to the user. In some implementations, the graphical user interface can include one or more display objects 604, 606. Each of the display objects 604, 606 can be a graphic representation of a system object. Some examples of system objects include device functions, applications, windows, files, alerts, events, or other identifiable system objects.

In some implementations, the mobile device 600 can implement multiple device functionalities, such as a telephony device, as indicated by a phone object 610; an e-mail device, as indicated by the e-mail object 612; a network data communication device, as indicated by the Web object 614; a Wi-Fi base station device (not shown); and a media processing device, as indicated by the media player object 616. In some implementations, particular device objects 604, e.g., the phone object 610, the e-mail object 612, the Web object 614, and the media player object 616, can be displayed in a menu bar 618. In some implementations, each of the device functionalities can be accessed from a top-level graphical user interface, such as the graphical user interface illustrated in FIG. 6. The objects 610, 612, 614 and 616 represent visual indicators of applications on the mobile device 600. Touching one of the objects 610, 612, 614 or 616 can, for example, invoke the corresponding functionality.

In some implementations, the mobile device 600 can implement network distribution functionality. For example, the functionality can enable the user to take the mobile device 600 and its associated network while traveling. In particular, the mobile device 600 can extend Internet access (e.g., via Wi-Fi) to other wireless devices in the vicinity. For example, mobile device 600 can be configured as a base station for one or more devices. As such, mobile device 600 can grant or deny network access to other wireless devices.

In some implementations, upon invocation of particular device functionality, the graphical user interface of the mobile device 600 changes, or is augmented or replaced with another user interface or user interface elements, to facilitate user access to particular functions associated with the corresponding device functionality. For example, in response to a user touching the phone object 610, the graphical user interface of the touch-sensitive display 602 may present display objects related to various phone functions; likewise, touching of the email object 612 may cause the graphical user interface to present display objects related to various e-mail functions; touching the Web object 614 may cause the graphical user interface to present display objects related to various Web-surfing functions; and touching the media player object 616 may cause the graphical user interface to present display objects related to various media processing functions.

In some implementations, the mobile device 600 can include one or more input/output (I/O) devices and/or sensor devices. For example, a speaker 660 and a microphone 662 can be included to facilitate voice-enabled functionalities, such as phone and voice mail functions. In some implementations, a loud speaker 664 can be included to facilitate hands-free voice functionalities, such as speaker phone functions. An audio jack 666 can also be included for use of headphones and/or a microphone.

In some implementations, a proximity sensor 668 can be included to facilitate the detection of the user positioning the mobile device 600 proximate to the user's ear and, in response, to disengage the touch-sensitive display 602 to prevent accidental function invocations. In some implementations, the touch-sensitive display 602 can be turned off to conserve additional power when the mobile device 600 is proximate to the user's ear.

Other sensors can also be used. For example, in some implementations, an ambient light sensor 670 can be utilized to facilitate adjusting the brightness of the touch-sensitive display 602. In some implementations, an accelerometer 672 can be utilized to detect movement of the mobile device 600, as indicated by the directional arrow 674. Accordingly, display objects and/or media can be presented according to a detected orientation, e.g., portrait or landscape. In some implementations, the mobile device 600 may include circuitry and sensors for supporting a location determining capability, such as that provided by the global positioning system (GPS), other global navigation satellite system, or other positioning system (e.g., systems using Wi-Fi access points, television signals, cellular grids, Uniform Resource Locators (URLs)). In some implementations, a positioning system (e.g., a GPS receiver) can be integrated into the mobile device 600 or provided as a separate device that can be coupled to the mobile device 600 through an interface (e.g., port device 690) to provide access to location-based services.

The mobile device 600 can also include a camera lens and sensor 680. In some implementations, the camera lens and sensor 680 can be located on the back surface of the mobile device 600. The camera can capture still images and/or video.

The mobile device 600 can also include one or more wireless communication subsystems, such as a 802.11b/g communication device 686, and/or a Bluetooth™ communication device 688. Other communication protocols can also be supported, including other 802.x communication protocols (e.g., WiMax, Wi-Fi), code division multiple access (CDMA), global system for mobile communications (GSM), Enhanced Data GSM Environment (EDGE), 3G (e.g., EV-DO, UMTS, HSDPA), etc.

In some implementations, a port device 690, e.g., a Universal Serial Bus (USB) port, or a docking port, or some other wired port connection, can be included. The port device 690 can, for example, be utilized to establish a wired connection to other computing devices, such as other communication devices 600, a personal computer, a printer, or other processing devices capable of receiving and/or transmitting data. In some implementations, the port device 690 allows the mobile device 600 to synchronize with a host device using one or more protocols.

Network Operating Environment

Figure 7:
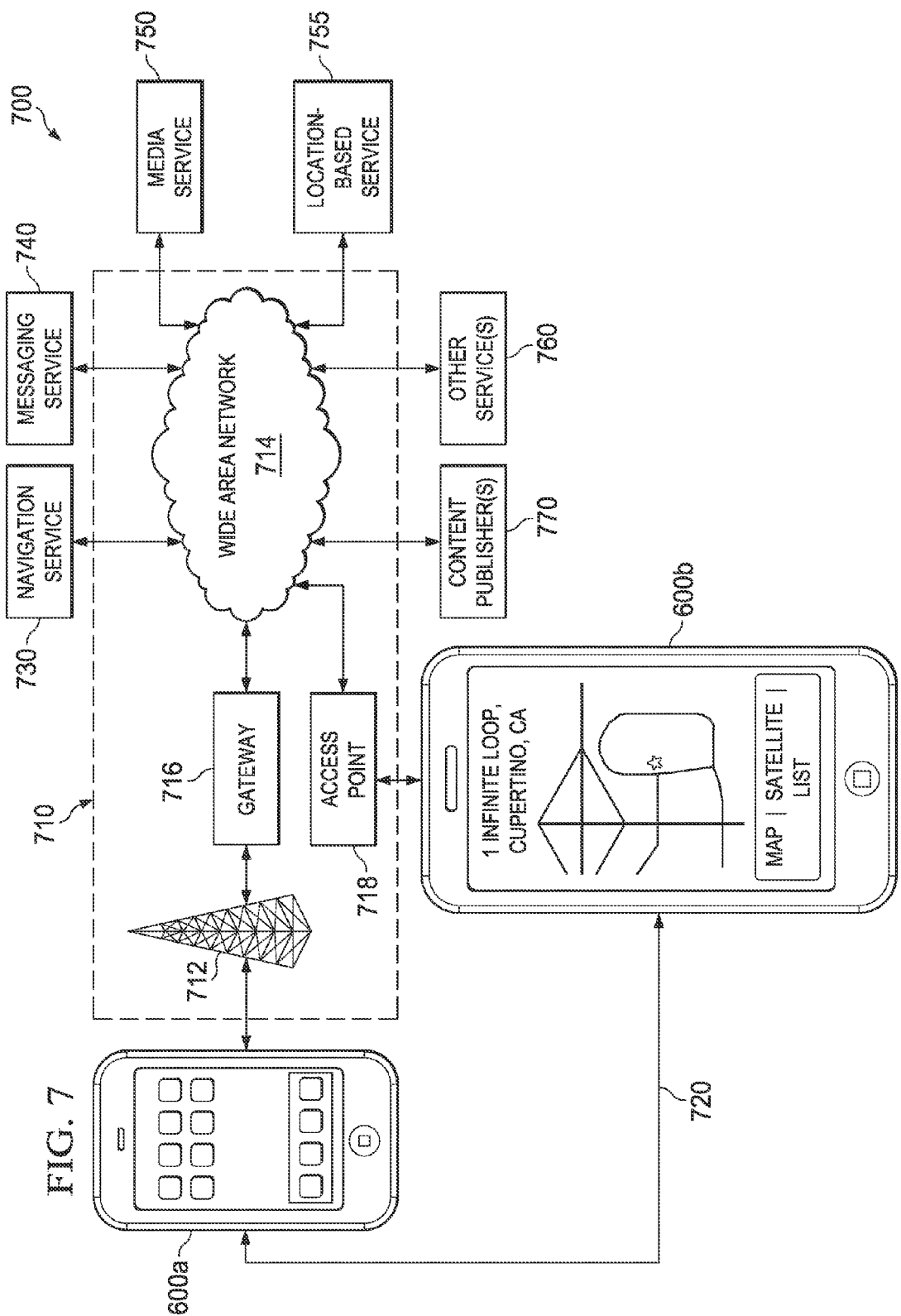
FIG. 7 is a block diagram of an example network operating environment for the mobile device of FIG. 6.

FIG. 7 is a block diagram of an example network operating environment 700 for the mobile device 600 of FIG. 6. The mobile device 600 of FIG. 6 can, for example, communicate over one or more wired and/or wireless networks 710 in data communication. For example, a wireless network 712, e.g., a cellular network, can communicate with a wide area network (WAN) 714, such as the Internet, by use of a gateway 716. Likewise, an access point 718, such as an 802.11g wireless access point, can provide communication access to the wide area network 714. In some implementations, both voice and data communications can be established over the wireless network 712 and the access point 718. For example, the mobile device 100a can place and receive phone calls (e.g., using VoIP protocols), send and receive e-mail messages (e.g., using POP3 protocol), and retrieve electronic documents and/or streams, such as web pages, photographs, and videos, over the wireless network 712, gateway 716, and wide area network 714 (e.g., using TCP/IP or UDP protocols). Likewise, the mobile device 100b can place and receive phone calls, send and receive e-mail messages, and retrieve electronic documents over the access point 718 and the wide area network 714. In some implementations, the mobile device 100 can be physically connected to the access point 718 using one or more cables and the access point 718 can be a personal computer. In this configuration, the mobile device 100 can be referred to as a "tethered" device.

The mobile devices 600a and 600b can also establish communications by other means. For example, the wireless device 600a can communicate with other wireless device, e.g., other wireless devices 600, cell phones, etc., over the wireless network 712. Likewise, the mobile devices 600a and 600b can establish peer-to-peer communications 720, e.g., a personal area network, by use of one or more communication subsystems, such as the Bluetooth™ communication device 688 shown in FIG. 6. Other communication protocols and topologies can also be implemented.

The mobile device 600 can, for example, communicate with one or more services 730, 740, 750, 755, and 760 and/or one or more content publishers 770 over the one or more wired and/or wireless networks 710. For example, a navigation service 730 can provide navigation information, e.g., map information, location information, route information, and other information, to the mobile device 600. In the example shown, a user of the mobile device 600b has invoked a map functionality, e.g., by touching the maps object 644 on the top-level graphical user interface shown in FIG. 6, and has requested and received a map for the location "1 Infinite Loop, Cupertino, Calif."

A messaging service 740 can, for example, provide e-mail and/or other messaging services. A media service 750 can, for example, provide access to media files, such as song files, movie files, video clips, and other media data. A location-based service 755 can, for example, provide data or content based on a current location of the mobile device 600. One or more other services 760 can also be utilized by the mobile device 600, including a syncing service, an activation service and a software update service that automatically determines whether software updates are available for software on the mobile device 600, then downloads the software updates to the mobile device 600 where the updates can be manually or automatically unpacked and/or installed.

The mobile device 600 can also access other data over the one or more wired and/or wireless networks 710. For example, content publishers 770, such as news sites, RSS feeds, web sites, blogs, social networking sites, developer networks, etc., can be accessed by the mobile device 600. Such access can be provided by invocation of a web browsing function or application (e.g., a browser) in response to a user touching the Web object 614.

Exemplary Device Architecture

Figure 8:
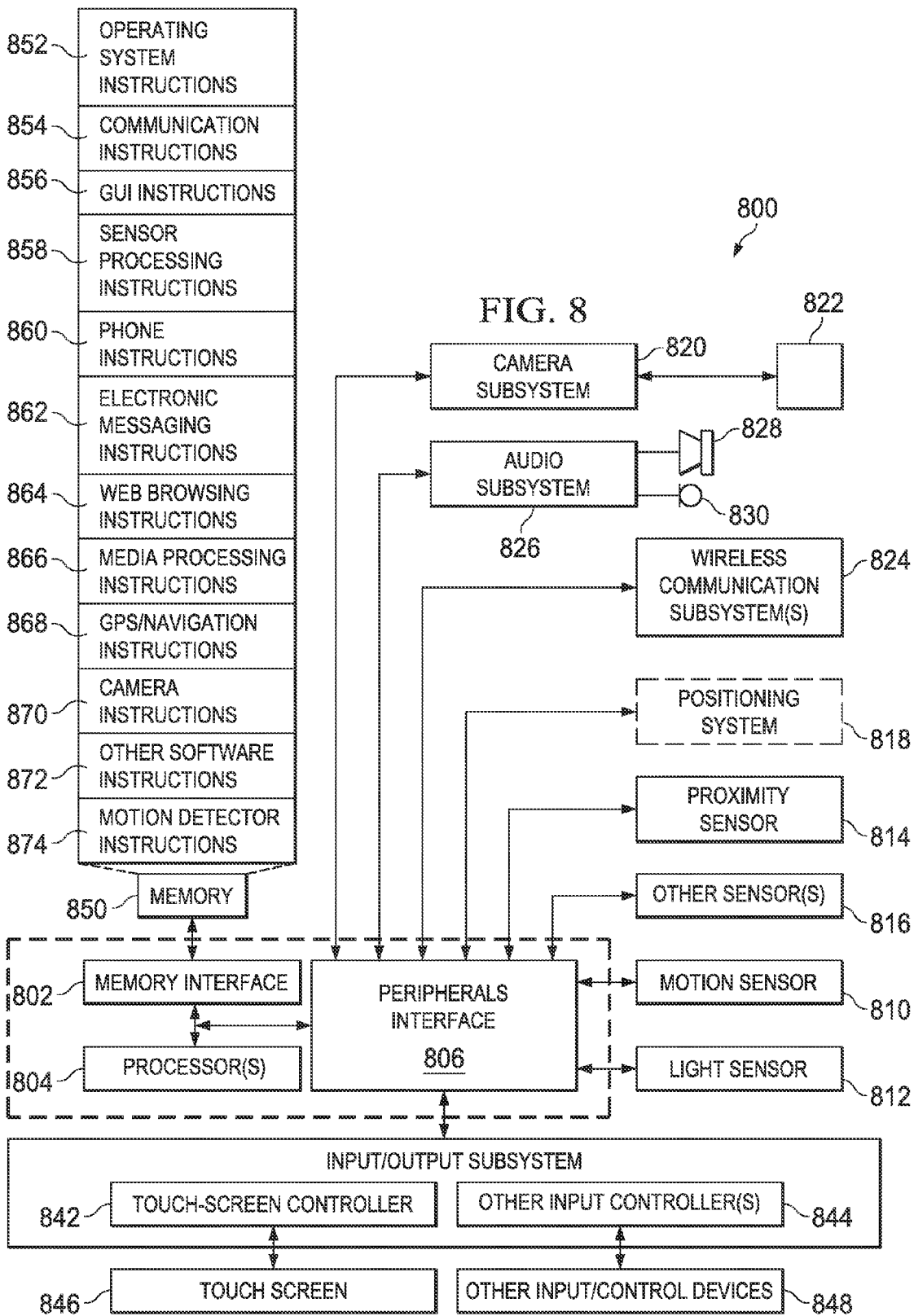
FIG. 8 is a block diagram of exemplary hardware architecture for implementing the processes described in reference to FIGS. 1-7.

FIG. 8 is a block diagram 800 of an example implementation of the mobile device 600 of FIG. 6. The mobile device 600 can include a memory interface 802 one or more data processors, image processors and/or central processing units 804, and a peripherals interface 806. The memory interface 802, the one or more processors 804 and/or the peripherals interface 806 can be separate components or can be integrated in one or more integrated circuits. The various components in the mobile device 600 can be coupled by one or more communication buses or signal lines.

Sensors, devices and subsystems can be coupled to the peripherals interface 806 to facilitate multiple functionalities. For example, a motion sensor 810, a light sensor 812, and a proximity sensor 814 can be coupled to the peripherals interface 806 to facilitate the orientation, lighting and proximity functions described with respect to FIG. 6. Other sensors 816 can also be connected to the peripherals interface 806, such as a GPS receiver, a temperature sensor, a biometric sensor, or other sensing device, to facilitate related functionalities.

A camera subsystem 820 and an optical sensor 822, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 824, which can include radio frequency receivers and transmitters and/or optical (e.g., infrared) receivers and transmitters. The specific design and implementation of the communication subsystem 824 can depend on the communication network(s) over which the mobile device 600 is intended to operate. For example, a mobile device 600 may include communication subsystems 824 designed to operate over a GSM network, a GPRS network, an EDGE network, a 3G or 4G network, a Wi-Fi or WiMax network, and a Bluetooth™ network. In particular, the wireless communication subsystems 824 may include hosting protocols such that the device 600 may be configured as a base station for other wireless devices.

An audio subsystem 826 can be coupled to a speaker 828 and a microphone 830 to facilitate voice-enabled functions, such as voice recognition, voice replication, digital recording, and telephony functions.

The I/O subsystem 840 can include a touch screen controller 842 and/or other input controller(s) 844. The touch-screen controller 842 can be coupled to a touch screen 846. The touch screen 846 and touch screen controller 842 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 846.

The other input controller(s) 844 can be coupled to other input/control devices 848, such as one or more buttons, rocker switches, thumb-wheel, infrared port, USB port, and/or a pointer device such as a stylus. The one or more buttons (not shown) can include an up/down button for volume control of the speaker 828 and/or the microphone 830.

In one implementation, a pressing of the button for a first duration may disengage a lock of the touch screen 846; and a pressing of the button for a second duration that is longer than the first duration may turn power to the mobile device 600 on or off. The user may be able to customize a functionality of one or more of the buttons. The touch screen 846 can, for example, also be used to implement virtual or soft buttons and/or a keyboard.

In some implementations, the mobile device 600 can present recorded audio and/or video files, such as MP3, AAC, and MPEG files. In some implementations, the mobile device 600 can include the functionality of an MP3 player, such as an iPod™. The mobile device 600 may, therefore, include a 36-pin connector that is compatible with the iPod. Other input/output and control devices can also be used.

The memory interface 802 can be coupled to memory 850. The memory 850 can include high-speed random access memory and/or non-volatile memory, such as one or more magnetic disk storage devices, one or more optical storage devices, and/or flash memory (e.g., NAND, NOR). The memory 850 can store an operating system 852, such as Darwin, RTXC, LINUX, UNIX, OS X, WINDOWS, or an embedded operating system such as VxWorks. The operating system 852 may include instructions for handling basic system services and for performing hardware dependent tasks. In some implementations, the operating system 852 handles timekeeping tasks, including maintaining the date and time (e.g., a clock) on the mobile device 600. In some implementations, the operating system 852 can be a kernel (e.g., UNIX kernel).

The memory 850 may also store communication instructions 854 to facilitate communicating with one or more additional devices, one or more computers and/or one or more servers. The memory 850 may include graphical user interface instructions 856 to facilitate graphic user interface processing; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GPS/Navigation instructions 868 to facilitate GPS and navigation-related processes and instructions; camera instructions 870 to facilitate camera-related processes and functions; other software instructions 872 to facilitate other related processes and functions; and/or motion detection instructions 874 to facilitate determination of a motion state of a mobile device based on sensor data.

The memory 850 can also store data, including but not limited to documents, images, video files, audio files, and other data.

In some implementations, the mobile device 600 includes a positioning system 818. In various implementations, the positioning system 818 can be provided by a separate device coupled to the mobile device 600, or can be provided internal to the mobile device. In some implementations, the positioning system 818 can employ positioning technology including a GPS, a cellular grid, URIs or any other technology for determining the geographic location of a device. In some implementations, the positioning system 818 can employ a service provided by a positioning service such as, for example, SkyHook Wireless of Boston, Mass., or Rosum Corporation of Mountain View, Calif. In other implementations, the positioning system 818 can be provided by an accelerometer and a compass using dead reckoning techniques. In such implementations, the user can occasionally reset the positioning system by marking the mobile device's presence at a known location (e.g., a landmark or intersection). In still other implementations, the user can enter a set of position coordinates (e.g., latitude, longitude) for the mobile device. For example, the position coordinates can be typed into the phone (e.g., using a virtual keyboard) or selected by touching a point on a map. Position coordinates can also be acquired from another device (e.g., a car navigation system) by syncing or linking with the other device. In other implementations, the positioning system 818 can be provided by using wireless signal strength and one or more locations of known wireless signal sources to provide the current location. Wireless signal sources can include access points and/or cellular towers. Other techniques to determine a current location of the mobile device 600 can be used and other configurations of the positioning system 818 are possible.

Each of the above identified instructions and applications can correspond to a set of instructions for performing one or more functions described above. These instructions need not be implemented as separate software programs, procedures or modules. The memory 850 can include additional instructions or fewer instructions. Furthermore, various functions of the mobile device 600 may be implemented in hardware and/or in software, including in one or more signal processing and/or application specific integrated circuits.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by a mobile device, the method comprising:
receiving accelerometer data from accelerometer sensors onboard the mobile device, wherein the accelerometer data comprises tri-axial accelerometer samples and represents acceleration of the mobile device in three-dimensional space;
determining, by one or more processors of the mobile device, an accelerometer signal vector representing at least a force due to gravity on the mobile device;

calculating, by the one or more processors of the mobile device, two-dimensional accelerometer data orthogonal to the accelerometer signal vector, including:
   computing a roll angle and a pitch angle required to rotate the accelerometer signal vector to substantially align with a vertical axis of the accelerometer samples; and
   rotating vectors representing each of the accelerometer samples by the computed roll and pitch angles such that the accelerometer signal vector is substantially aligned with the vertical axis and an orthogonal plane that is orthogonal to the accelerometer signal vector is orthogonal to the vertical axis; and
determining, by the one or more processors of the mobile device, a motion state of the mobile device based on the two-dimensional accelerometer data, wherein determining the motion state includes determining at least one of whether the mobile device has a vertical movement motion state or whether the mobile device has a horizontal movement motion state.

2. The method of claim 1, wherein the accelerometer data comprises a time series vector of the tri-axial accelerometer samples.

3. The method of claim 2, wherein determining the accelerometer signal vector includes:
   dividing the time series vector of tri-axial accelerometer samples into a first and second part, each of the first and second parts including at least a threshold number of discrete sensor samples;
   determining the accelerometer signal vector based on vector components of a gravity signal contained in the accelerometer samples of the first part; and
   identifying the orthogonal plane.

4. The method of claim 3, wherein the accelerometer signal vector includes vector components of accelerometer sensor bias present on each axis of the tri-axial accelerometer samples.

5. The method of claim 3, wherein rotating the vectors representing each of the accelerometer samples includes:
   rotating the vectors representing each of the accelerometer samples in the second part by the computed roll and pitch angles.

6. The method of claim 5, wherein determining the motion state of the mobile device includes:
   identifying values of vector components of the rotated accelerometer samples in the orthogonal plane;
   integrating the values of the vector components over a duration of the second part;
   determining that the mobile device has at least the horizontal movement motion state if the integrated values exceed a horizontal motion threshold value;
   identifying a variance in the vertical axis of the accelerometer samples; and
   determining that the mobile device has at least the vertical movement motion state if the variance in the vertical axis exceeds a vertical motion threshold value.

7. The method of claim 1 further comprising using a speed of the mobile device calculated based on global navigation satellite system signals to verify the determined motion state of the mobile device.

8. The method of claim 1 further comprising assigning a confidence level associated with the determined motion state of the mobile device based on one or more previous determinations of motion state of the mobile device.

9. A non-transitory computer-readable storage medium storing a computer program product, the computer program product including instructions that, when executed, cause one or more processors of a mobile device to perform operations comprising:
   receiving accelerometer data from accelerometer sensors onboard the mobile device, wherein the accelerometer data comprises tri-axial accelerometer samples and represents acceleration of the mobile device in three-dimensional space;
   determining an accelerometer signal vector representing at least a force due to gravity on the mobile device;
   calculating two-dimensional accelerometer data orthogonal to the accelerometer signal vector, including:
      computing a roll angle and a pitch angle required to rotate the accelerometer signal vector to substantially align with a vertical axis of the accelerometer samples; and
      rotating vectors representing each of the accelerometer samples by the computed roll and pitch angles such that the accelerometer signal vector is substantially aligned with the vertical axis and an orthogonal plane that is orthogonal to the accelerometer signal vector is orthogonal to the vertical axis; and
   determining a motion state of the mobile device based on the two-dimensional accelerometer data, wherein determining the motion state includes determining at least one of whether the mobile device has a vertical movement motion state or whether the mobile device has a horizontal movement motion state.

10. The non-transitory computer-readable storage medium of claim 9, wherein the accelerometer data comprises a time series vector of the tri-axial accelerometer samples.

11. The non-transitory computer-readable storage medium of claim 10, wherein determining the accelerometer signal vector includes:
   dividing the time series vector of tri-axial accelerometer samples into a first and second part, each of the first and second parts including at least a threshold number of discrete sensor samples;
   determining the accelerometer signal vector based on vector components of a gravity signal contained in the accelerometer samples of the first part; and
   identifying the orthogonal plane.

12. The non-transitory computer-readable storage medium of claim 11, wherein rotating the vectors representing each of the accelerometer samples includes:
   rotating the vectors representing each of the accelerometer samples in the second part by the computed roll and pitch angles.

13. The non-transitory computer-readable storage medium of claim 12, wherein determining the motion state of the mobile device includes:
   identifying values of vector components of the rotated accelerometer samples in the orthogonal plane;
   integrating the values of the vector components over a duration of the second part;
   determining that the mobile device has at least the horizontal movement motion state if the integrated values exceed a horizontal motion threshold value;
   identifying a variance in the vertical axis of the accelerometer samples; and
   determining that the mobile device has at least the vertical movement motion state if the variance in the vertical axis exceeds a vertical motion threshold value.

14. The non-transitory computer-readable storage medium of claim 9 further comprising using a speed of the mobile device calculated based on global navigation satellite system signals to verify the determined motion state of the mobile device.

15. The non-transitory computer-readable storage medium of claim 9 further comprising assigning a confidence level associated with the determined motion state of the mobile device based on one or more previous determinations of motion state of the mobile device.

16. A mobile device comprising:
   accelerometer sensors operable to generate accelerometer data, wherein the accelerometer data comprises tri-axial accelerometer samples and represents acceleration of the mobile device in three-dimensional space; and
   a motion detector module including one or more processors configured to perform operations comprising:
      receiving the accelerometer data from the accelerometer sensors;
      determining an accelerometer signal vector representing at least a force due to gravity on the mobile device;
      calculating two-dimensional accelerometer data orthogonal to the accelerometer signal vector, including:
         computing a roll angle and a pitch angle required to rotate the accelerometer signal vector to substantially align with a vertical axis of the accelerometer samples; and
         rotating vectors representing each of the accelerometer samples by the computed roll and pitch angles such that the accelerometer signal vector is substantially aligned with the vertical axis and an orthogonal plane that is orthogonal to the accelerometer signal vector is orthogonal to the vertical axis; and
      determining a motion state of the mobile device based on the two-dimensional accelerometer data, wherein determining the motion state includes determining at least one of whether the mobile device has a vertical movement motion state or whether the mobile device has a horizontal movement motion state.

17. The mobile device of claim 16, wherein the accelerometer data comprises a time series vector of the tri-axial accelerometer samples.

18. The mobile device of claim 16, wherein determining the accelerometer signal vector includes:
   dividing the time series vector of tri-axial accelerometer samples into a first and second part, each of the first and second parts including at least a threshold number of discrete sensor samples;
   determining the accelerometer signal vector based on vector components of a gravity signal contained in the accelerometer samples of the first part; and
   identifying the orthogonal plane.

19. The mobile device of claim 18, wherein rotating the vectors representing each of the accelerometer samples includes:
   rotating the vectors representing each of the accelerometer samples in the second part by the computed roll and pitch angles.

20. The mobile device of claim 19, wherein determining the motion state of the mobile device includes:
   identifying values of vector components of the rotated accelerometer samples in the orthogonal plane;
   integrating the values of the vector components over a duration of the second part;
   determining that the mobile device has at least the horizontal movement motion state if the integrated values exceed a horizontal motion threshold value;
   identifying a variance in the vertical axis of the accelerometer samples; and
   determining that the mobile device has at least the vertical movement motion state if the variance in the vertical axis exceeds a vertical motion threshold value.

* * * * *